United States Patent Office 3,006,775
Patented Oct. 31, 1961

3,006,775
CERAMIC MATERIAL AND METHOD OF
MAKING THE SAME
Franklin P. H. Chen, Pittsfield, Mass., assignor to General Electric Company, a corporation of New York
No Drawing. Filed Sept. 23, 1959, Ser. No. 841,681
6 Claims. (Cl. 106—39)

The present invention relates to the preparation of ceramic products, and more particularly to an improved process for making crystalline ceramic products of high mechanical strength and good electrical properties.

Ceramic materials such as porcelain, alumina, and the like have been found advantageous for use as electrical insulating material where high strength coupled with good electrical insulating properties are desirable. A difficulty in the use of the known materials of this type, however, have been the relatively complicated and expensive processes necessary to fabricate such materials in the desired product configuration. Such processes normally entail the use of elevated firing temperatures and extremely high molding pressure to properly compact and harden the material and mold it in the desired shape. While glass-forming mixtures have been readily formed into insulating products of desired shape by simple casting techniques, such a procedure is not effective or practical with porcelain or other known ceramic type compositions. For one thing, the ceramic compositions would require extremely high temperatures, e.g., of the order of 1800° C., to make them sufficiently fluid for casting purposes. A further difficulty is that such compositions, even if made sufficiently molten for casting, would tend to crystallize immediately upon being poured into a mold, giving rise to a process of devitrification which is difficult to control. The usual effect of such rapid crystallization or devitrification is the formation of crystals which are relatively large and non-uniform in size, and consequently the mechanical and electrical qualities of the final ceramic product are much less favorable than those obtained in products composed of small, uniformly sized, compactly arranged crystals.

It is an object of the present invention to provide hard, dense ceramic products having high mechanical strength and good electrical properties by a simplified process which avoids the above disadvantages of the known methods for making ceramic products.

It is another object of the invention to provide a method of making ceramic products of the above type which is simple and economical, and is readily carried out to produce ceramic products of any desired configuration.

It is still another object of the invention to provide a composition of material which is adapted to produce ceramic products by simple casting techniques.

It is still another object of the invention to provide a ceramic composition and method of making the same, as described above wherein the ceramic is composed essentially of synthetic lithium aluminum silicate crystals or lithium silicate crystals or a combination of both.

The above objects and others which will be apparent from the following description and appended claims, are attained in accordance with the invention by forming a melt of a composition comprising $Li_2O$, $SiO_2$, and $Al_2O_3$, and preferably including a fluxing agent, the ingredients being present in the proper proportions as hereinafter more fully described, cooling the melt to arrest the formation of crystals therein and forming thereby an amorphous, vitreous material, and thereafter heating the thus formed vitreous material for converting it to a microcrystalline ceramic body composed predominantly of a homogeneous mass of minute, uniformly sized, randomly oriented lithium aluminum silicate and/or lithium silicate crystals.

In accordance with the present invention, it is unnecessary to incorporate a nucleating agent in the molten composition to induce the nucleation or growth of crystals during the subsequent thermal treatment of the vitreous material. The composition ingredients and proportions thereof are such that a metastable glass material is initially formed, which requires only a small amount of energy, supplied by the thermal treatment, to be converted from an amorphous, vitreous phase to a crystalline ceramic phase by a process of auto-crystallization.

The invention is further significant in that the composition employed does not, after being cast, tend to rapidly crystallize or devitrify under ordinary cooling procedures as is characteristic of known types of ceramic-forming compositions, and elaborate procedures to avoid uncontrolled devitrification are therefore unnecessary.

The composition of the lithium aluminum silicate ceramic material produced in accordance with the invention is as follows, the approximate ranges of the constituent amounts being in percent by weight:

|  | Percent |
| --- | --- |
| $Li_2O$ | 4–30 |
| $SiO_2$ | 50–80 |
| $Al_2O_3$ | 3–25 |

While it is not absolutely necessary for additional materials such as fluxing agents to be used, it is preferable that suitable fluxing agents be employed up to about 15% by weight. In this connection, the term "fluxing agents" as used herein is intended to mean glass modifiers which can improve the glass properties or the properties of final product, or which can improve the melting characteristics of the glass compositions, as well understood in the art. Fluxing agents which may be suitably used in the above composition include, but are not limited to, $Na_2O$, $K_2O$, $B_2O_3$, $CaF_2$, $ZrO_2$, $CaO$, $ZnO$, $MgO$, $NaF$, $KF$ and $BaO$, and combinations thereof.

The following are examples of compositions which have produced satisfactory results in accordance with the invention, it being understood that the following specific compositions are given for illustration only and are not intended to limit the scope of the invention:

Example I

| Batch material: | Batch percent |
| --- | --- |
| Lithium carbonate | 36.50 |
| Alumina | 15.70 |
| Flint | 43.00 |
| Soda ash | 4.80 |

| Product material: | Product Percent |
| --- | --- |
| $Li_2O$ | 19.4 |
| $Al_2O_3$ | 20.6 |
| $SiO_2$ | 56.3 |
| $Na_2O$ | 3.7 |

The above composition produced a white, hard, dense ceramic body and had a melting temperature of about 1200° C. The initial crystallization temperature was about 700° C. and the optimum crystal growth temperature was about 950° C.

Example II

| Batch material: | Batch percent |
| --- | --- |
| Lithium carbonate | 37.80 |
| Alumina | 4.59 |
| Flint | 55.00 |
| Soda ash | 2.61 |

Product material: Product Percent
- $Li_2O$ — 20.00
- $Al_2O_3$ — 6.00
- $SiO_2$ — 72.00
- $Na_2O$ — 2.00

The above composition also yielded a hard, dense, ceramic body and had a melting temperature of about 1150° C. The initial crystallization temperature was about 650° C. and the optimum crystal growth temperature was about 900° C.

*Example III*

Batch material: Batch percent
- Lithium carbonate — 42.7
- Alumina — 8.3
- Flint — 49.0

Product material: Product percent
- $Li_2O$ — 23.2
- $Al_2O_3$ — 11.0
- $SiO_2$ — 65.8

The melting temperature of this composition was about 1150° C., the initial crystallization temperature was 650°C., and the optimum crystal growth temperature was about 950° C.

*Example IV*

Batch material: Batch percent
- Lithium carbonate — 39.0
- Alumina — 12.0
- Flint — 45.8
- Soda ash — 1.9
- Potassium nitrate — 1.3

Product material: Product percent
- $Li_2O$ — 21.0
- $Al_2O_3$ — 16.0
- $SiO_2$ — 61.0
- $Na_2O$ — 1.5
- $K_2O$ — 0.5

The above composition had a melting temperature of about 1150° C., and the initial and optimum crystal growth temperatures were about the same as those of the preceding example.

*Example V*

Batch material: Batch percent
- Lithium carbonate — 17.30
- Alumina — 14.85
- Flint — 51.20
- Potassium nitrate — 4.03
- Fluorspar — 1.70
- Zirconium oxide — 5.80
- Boric acid — 5.12

Product material: Product percent
- $Li_2O$ — 8.23
- $Al_2O_3$ — 17.40
- $SiO_2$ — 60.00
- $K_2O$ — 2.20
- $CaF_2$ — 2.00
- $ZrO_2$ — 6.78
- $B_2O_3$ — 3.39

The above composition had a melting temperature of about 1450° C., and the initial crystallization temperature was 750° C. and optimum crystal growth temperature was about 1000° C.

It will be understood that the oxides contained in the products of the above examples may be introduced as pure compounds or as minerals containing two or more of the oxides. For example, kaolin may be used for introducing both $Al_2O_3$ and part of the $SiO_2$.

X-ray diffraction analysis made of the products of the present invention indicates that the ceramic material is composed of a micro-crystalline mass containing predominantly crystals of lithium aluminum silicate or lithium silicate or a combination of both.

The following which is applicable, for example, to the composition of Example IV, is a typical process for making the ceramic material of the invention, it being understood that variations may be made in the specific procedure and values set forth herein without departing from the inventive concept.

The raw materials of the batch composition, finely divided by a ball mill or the like, are mixed in the proper proportions and melted in an electric furnace at a temperature in the vicinity of 1200° C. A centrifugal steel mold is prepared for producing a bushing configuration of the melt, and the necessary metal hardware placed in the mold for embedding in the final product. With the mold preheated to a temperature of about 200–300° C., the molten batch composition is poured therein to a predetermined level. The casting temperature of the molten material at this stage is about 1150° C. The mold which contains molten material is spun about its axis so that the molten contents take on the configuration of the mold. The material is allowed to cool in the mold to below its softening temperature, e.g. about 600° C., that is to say, to a temperature at which the molten material becomes sufficiently solidified to prevent its slumping in the mold and to ensure sufficient rigidity to provide a self-supporting cast product.

Of particular significance in accordance with the invention is the arresting of crystallization of the molten material by such cooling to a temperature at which the amorphous material becomes extremely viscous or almost solidified. This prevents the formation of large crystals of non-uniform size which would otherwise occur to produce what is known as devitrification, a crystallizing action which is not readily controlled and which yields crystals of a type and arrangement which are not desired for the purposes of the present invention.

With the cast material thus cooled, the melted amorphous article is removed from the mold, placed in an annealing furnace at about 500° C., and retained therein for a sufficient period of time for the entire structure to attain the furnace temperature. At this stage the molded product is an amorphous, vitreous material having no crystals therein. The article is then heated up to about 650° C. and held at this temperature for the purpose of initiating the autocrystallization process. The article is maintained at this temperature for a sufficient period, e.g., 15 minutes to 2½ hours, with ½ to 1 hour being optimum, in order to produce a support skeleton of crystals in the product to ensure that it is self-supporting before the temperature is raised to the optimum crystallization level. As soon as this result is obtained, the temperature is raised to about 950° C. and held for about 1 to 8 hours, with about 4 hours being the optimum time. These conditions are optimum for inducing the growth of crystals of the desired form and orientation. Thereafter the product is gradually cooled to room temperature.

If desired, during the initial cooling step, the product may be cooled to room temperature for the purpose of inspection to determine whether the amorphous glassy phase of the molded article has any defects. After this procedure, the article may be subjected to the heating temperatures described above to initiate and complete the auto-crystallization process.

As will be understood, the particular temperatures and other values set forth may be different from those stated depending on the particular composition employed, since different compositions may be characterized by different softening melting, and initial and optimum crystallization temperatures.

As a result of the described process there is obtained a hard, dense, crystalline ceramic-like body of good electrical and mechanical properties wherein the metal hardware and ceramic material are joined in a strong, fluid-tight ceramic-to-metal seal.

The invention thus provides a novel ceramic product and method of making the same which affords numerous advantages over the prior known ceramic materials and processes. For example, as compared to porcelain, more precise dimensional tolerances are obtainable in the final product due to less shrinkage during the processing, the material is easier to work, shorter and more efficient manufacturing cycles are made possible, better hermetic seals with the metal parts are achieved, and the ceramic product can be re-used even if broken.

Although the described material is particularly adapted for simple casting procedures, it may, after being poured in molten form into a mold, be subjected to pressing operations to achieve more sharply defined configurations. It is not, however, necessary to employ high pressures to achieve coherence or high density of the mass, as in the case of porcelain and other ceramics.

The described material has also been found useful as a bonding agent, as for example for such materials as alumina, magnesia, silicon carbide, mica isomorphs, and the like, and affords thereby improved mechanical and electrical properties for such bodies as compared to glass-bonded or porcelain-bonded materials.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A hard, dense, mechanically strong, electrically insulating ceramic material formed of a substantially homogeneous micro-crystalline mass of synthetic crystals selected from the group consisting of lithium aluminum silicate crystals and lithium silicate crystals, and combinations thereof, said material having the following approximate composition in percent by weight:

| | Percent |
|---|---|
| $Li_2O$ | 4–30 |
| $SiO_2$ | 50–80 |
| $Al_2O_3$ | 3–25 |
| Fluxing agent | Up to 15 |

2. A hard, dense, mechanically strong, electrically insulating ceramic material formed of a substantially homogeneous micro-crystalline mass of synthetic crystals selected from the group consisting of lithium aluminum silicate crystals and lithium silicate crystals, and combinations thereof, said material having the following approximate composition in percent by weight:

| | Percent |
|---|---|
| $Li_2O$ | 4–30 |
| $SiO_2$ | 50–80 |
| $Al_2O_3$ | 3–25 |
| Fluxing agent | Up to 15 | said fluxing agent being selected from the group consisting of $Na_2O$, $K_2O$, $B_2O_3$, $CaF_2$, $ZrO_2$, CaO, BaO, ZnO, MgO, NaF, and KF, and combinations thereof.

3. A hard, dense, mechanically strong, electrically insulating ceramic material formed of a substantially homogeneous micro-crystalline mass of synthetic crystals selected from the group consisting of lithium aluminum silicate crystals and lithium silicate crystals, and combinations thereof, said material having the following approximate composition in percent by weight:

| | Percent |
|---|---|
| $Li_2O$ | 21.0 |
| $Al_2O_3$ | 16.0 |
| $SiO_2$ | 61.0 |
| $Na_2O$ | 1.5 |
| $K_2O$ | 0.5 |

4. The method of making a hard, dense, mechanically strong, electrically insulating ceramic material which comprises forming a melt of a material having the following approximate composition in percent by weight:

| | Percent |
|---|---|
| $Li_2O$ | 4–30 |
| $SiO_2$ | 50–80 |
| $Al_2O_3$ | 3–25 |
| Fluxing agent | Up to 15 | cooling said melt to about the softening temperature thereof to arrest the formation of crystals therein and forming thereby an amorphous, vitreous material, heating the thus formed vitreous material to a temperature of about 650–700° C. and maintaining the temperature for a period of about ¼ to 2½ hours to initiate crystallization of said material, and thereafter heating the material to about 900–1000° C. and maintaining this temperature for a period of about 1 to 8 hours for converting the same to a micro-crystalline ceramic body composed predominantly of synthetic crystals selected from the group consisting of lithium aluminum silicate crystals and lithium silicate crystals, and combinations thereof.

5. The method of making a hard, dense, mechanically strong, electrically insulating ceramic material which comprises forming a melt of a material having the following approximate composition in percent by weight:

| | Percent |
|---|---|
| $Li_2O$ | 4–30 |
| $SiO_2$ | 50–80 |
| $Al_2O_3$ | 3–25 |
| Fluxing agent | Up to 15 | casting said melt into a mold, cooling the melt in said mold to the softening temperature of the melt to arrest the formation of crystals therein and forming thereby an amorphous, vitreous product having the form imparted by said mold, removing said product from the mold, heating the thus formed vitreous product to a temperature of about 650–700° C. and maintaining the temperature for a period of about ¼ to 2½ hours to initiate crystallization of said material, and thereafter heating the material to about 900–1000° C. and maintaining this temperature for a period of about 1 to 8 hours for converting the same to a micro-crystalline ceramic body composed predominantly of synthetic crystals selected from the group consisting of lithium aluminum silicate and lithium silicate crystals, and combinations thereof.

6. The method of making a hard, dense, mechanically strong, electrically insulating ceramic material which comprises forming a melt of a material having the following approximate composition in percent by weight:

| | Percent |
|---|---|
| $Li_2O$ | 4–30 |
| $SiO_2$ | 50–80 |
| $Al_2O_3$ | 3–25 |
| Fluxing agent | Up to 15 | casting said melt into a mold having metal parts arranged therein for embedding in the cast product, cooling the melt in said mold to the softening temperature of the melt to arrest the formation of crystals therein and forming thereby an amorphous, vitreous product having the form imparted by said mold, removing said product from the mold, heating the thus formed vitreous product to a temperature of about 650–700° C. and maintaining the temperature for a period of about ¼ to 2½ hours to initiate crystallization in said material, and thereafter heating the material to about 900–1000° C. and maintaining this temperature for a period of about 1 to 8 hours for converting the same to a micro-crystalline ceramic body composed predominantly of synthetic crystals selected from the group consisting of lithium aluminum silicate crystals and lithium silicate crystals, and combinations thereof.

References Cited in the file of this patent
UNITED STATES PATENTS

| | | |
|---|---|---|
| 2,920,971 | Stookey | Jan. 12, 1960 |
| 2,960,801 | King et al. | Nov. 22, 1960 |
| 2,960,802 | Voss | Nov. 22, 1960 |

OTHER REFERENCES

Roy et al.: "The System Lithium Metasilicate-Spodumene-Silica," J. Amer. Chem. Soc., vol. 71, June 1949 (pages 2086–2095).

Murthy et al.: "Phase Equilibria in the System Lithium Metasilicate-B-Eucryptite," J. Amer. Ceramic Soc., vol. 37, January 1954 (pages 14–17).